(12) United States Patent
Cheng et al.

(10) Patent No.: US 12,262,258 B2
(45) Date of Patent: Mar. 25, 2025

(54) EARLY MEASUREMENTS DURING INTER-RAT CELL RESELECTION IN WIRELESS COMMUNICATION

(71) Applicant: QUALCOMM Incorporated, San Diego, CA (US)

(72) Inventors: Peng Cheng, San Diego, CA (US); Masato Kitazoe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 17/629,472

(22) PCT Filed: Jul. 26, 2019

(86) PCT No.: PCT/CN2019/097851
§ 371 (c)(1),
(2) Date: Jan. 24, 2022

(87) PCT Pub. No.: WO2021/016734
PCT Pub. Date: Feb. 4, 2021

(65) Prior Publication Data
US 2022/0248277 A1  Aug. 4, 2022

(51) Int. Cl.
*H04W 36/00* (2009.01)
*H04W 36/08* (2009.01)
*H04W 36/14* (2009.01)

(52) U.S. Cl.
CPC . *H04W 36/0058* (2018.08); *H04W 36/00692* (2023.05); *H04W 36/0085* (2018.08); *H04W 36/08* (2013.01); *H04W 36/144* (2023.05)

(58) Field of Classification Search
CPC ....... H04W 36/0058; H04W 36/00069; H04W 36/0085; H04W 36/08; H04W 36/14; H04W 24/10; H04L 5/0035
See application file for complete search history.

(56) References Cited

U.S. PATENT DOCUMENTS 9,655,015 B2   5/2017   Yang et al.
9,949,161 B2   4/2018   Mandil et al.
(Continued)

FOREIGN PATENT DOCUMENTS

CN   103650583 A   3/2014
CN   104956726 A   9/2015
(Continued)

OTHER PUBLICATIONS

"Fast SN addition via early measurement reporting" Athens, Greece. Feb. 15, 2019 (Year: 2019).*
(Continued)

*Primary Examiner* — Mewale A Ambaye
(74) *Attorney, Agent, or Firm* — Shumaker & Sieffert, PA

(57) ABSTRACT

Aspects of the present disclosure relate to apparatuses, methods, and systems for performing early measurements during inter-RAT reselection. During cell reselection, a user equipment (UE) switches from a first cell using a first radio access technology (RAT) to a second cell using a second RAT that is different from the first RAT. The UE receives a measurement configuration from the first cell, and the measurement configuration configures the UE to perform early measurements for at least one RAT. After reselecting to the second cell, the UE determines whether to continue the early measurements based on the measurement configuration.

60 Claims, 11 Drawing Sheets

Early Measurements Configuration For Source RAT Only - Example 2

(56) References Cited

U.S. PATENT DOCUMENTS

| | | | |
|---|---|---|---|
| 2013/0244657 A1 | 9/2013 | Wang et al. | |
| 2013/0250784 A1 | 9/2013 | Mandadapu et al. | |
| 2021/0051506 A1* | 2/2021 | Lee | H04W 48/10 |
| 2022/0174566 A1* | 6/2022 | Shreevastav | H04W 36/302 |
| 2022/0369180 A1* | 11/2022 | Dange | H04W 36/0058 |
| 2023/0180089 A1* | 6/2023 | Panwar | H04W 36/0085 |
| | | | 370/331 |
| 2023/0209420 A1* | 6/2023 | Xie | H04W 36/24 |
| | | | 370/332 |
| 2023/0247498 A1* | 8/2023 | Wang | H04W 48/20 |
| | | | 455/67.11 |
| 2023/0319657 A1* | 10/2023 | Santhanam | H04W 36/00835 |
| | | | 370/252 |
| 2024/0040626 A1* | 2/2024 | Tseng | H04W 72/542 |

FOREIGN PATENT DOCUMENTS

| | | | |
|---|---|---|---|
| CN | 105992258 A | 10/2016 | |
| EP | 3949532 A1 | 2/2022 | |
| EP | 3972326 A1 | 3/2022 | |
| WO | 2012162633 A1 | 11/2012 | |
| WO | 2013138605 A2 | 9/2013 | |
| WO | 2013142675 A1 | 9/2013 | |
| WO | 2016200877 | 12/2016 | |
| WO | 2017023345 A1 | 2/2017 | |
| WO | 2017185252 A1 | 11/2017 | |
| WO | WO-2020197460 A1 * | 10/2020 | H04W 24/10 |

OTHER PUBLICATIONS

"Validity timer handling and behavior on early measurement" Reno, USA. May 13, 2019 (Year: 2019).*

NPL Document, "Fast SN addition via early measurement reporting" Athens, Greece. Feb. 15, 2019 (Year: 2019).*

NPL Document, "Validity timer handling and behavior on early measurement" Reno, USA. May 13, 2019 (Year: 2019).*

Co-pending U.S. Appl. No. 17/629,472, inventor Cheng; Peng, filed on Jan. 24, 2022.

RAN WG2 "Radio Measurement Collection for Minimization of Drive Tests (MDT)", 3GPP TS 37.320 v11.4.0 (Sep. 2014) Sep. 20, 2014 (Sep. 20, 2014), pp. 1-23.

"UE Behaviours in NR Early Measurements" Qualcomm Incorporated. {3GPP TSG RAN WG2 Meeting #106, R2-1905543} May 17, 2019, Section 2.4.

International Search Report and Written Opinion issued in corresponding PCT/CN2019/097851, mailed Apr. 17, 2020.

Huawei., et al., "Fast SN Addition via Early Measurement Reporting", 3GPP TSG-RAN WG2 #105, R2-1901615, 3rd Generation Partnership Project, Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 15, 2019, 6 Pages, XP051602970.

Supplementary European Search Report—EP19939955—Search Authority—Munich—Mar. 7, 2023.

Vivo: "Validity Timer Handling and Behavior on Early Measurement", 3GPP TSG-RAN WG2 Meeting #106, R2-1905820, 3rd Generation Partnership Project, Mobile Competence Centre, 650, Route Des Lucioles, F-06921 Sophia-Antipolis Cedex, France, vol. RAN WG2, No. Reno, US, May 13, 2019-May 17, 2019, May 13, 2019, 3 Pages, XP051729319.

Taiwan Search Report—TW109121819—TIPO—Nov. 5, 2023.

* cited by examiner

EARLY MEASUREMENTS DURING INTER-RAT CELL RESELECTION IN WIRELESS COMMUNICATION

CROSS REFERENCE TO RELATED APPLICATION

This application is a national stage filing under 35 U.S.C. § 371 of International Patent Application No. PCT/CN2019/097851, filed on Jul. 26, 2019, the entire content of which is incorporated herein by reference as if fully set forth below in its entirety and for all applicable purposes.

TECHNICAL FIELD

The technology discussed below relates generally to wireless communication systems, and more particularly, to measurements (e.g., early measurements) in wireless communication. Embodiments can provide and enable techniques for early measurements during inter-RAT cell reselection in wireless communication.

INTRODUCTION

In wireless communication, a network can configure a user equipment (UE) to perform certain measurements of the network for various purposes. For example, a cellular communication network may configure a UE to perform early measurements during an idle mode to facilitate carrier aggregation (CA) and/or dual connectivity (DC). The network may use CA to allow a UE to simultaneously transmit and receive data on multiple component carriers in a cell. The use of CA can increase user throughput by aggregating the bandwidth of multiple component carriers. The network may use DC to allow a UE to simultaneously transmit and receive data on multiple component carriers from different cells (e.g., a primary cell and one or more secondary cells). The use of DC can increase user throughput, provide mobility robustness, and support load-balancing among cells.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a method of operating a user equipment (UE) in a network that includes a first cell and a second cell. The UE receives a measurement configuration from the first cell using a first radio access technology (RAT). The measurement configuration configures the UE to perform early measurements for at least one RAT including the first RAT. The UE reselects from the first cell to the second cell that is configured to use a second RAT. The UE determines whether to continue the early measurements after reselecting to the second cell based on the measurement configuration. The UE may report the early measurements to the second cell.

Another aspect of the present disclosure provides a user equipment (UE) for wireless communication. The UE includes a communication interface configured to communicate with a network including a first cell and a second cell, a memory, and a processor operatively coupled to the communication interface and the memory. The processor and the memory are configured to receive a measurement configuration from the first cell using a first radio access technology (RAT). The measurement configuration configures the UE to perform early measurements for at least one RAT including the first RAT. The processor and the memory are further configured to reselect from the first cell to the second cell that is configured to use a second RAT. The processor and the memory are further configured to determine whether to continue the early measurements after reselecting to the second cell based on the measurement configuration. The processor and the memory are further configured to report the early measurements to the second cell.

Another aspect of the present disclosure provides a non-transitory computer readable medium including executable code that when executed by a user equipment (UE) in a network including a first cell and a second cell, causes the UE to receive a measurement configuration from the first cell using a first radio access technology (RAT). The measurement configuration configures the UE to perform early measurements for at least one RAT including the first RAT. The executable code further causes the UE to reselect from the first cell to the second cell configured to use a second RAT, determine whether to continue the early measurements after reselecting to the second cell based on the measurement configuration, and report the early measurements to the second cell.

Another aspect of the present disclosure provides a user equipment (UE) in a network including a first cell and a second cell. The UE includes means for receiving a measurement configuration from the first cell using a first radio access technology (RAT). The measurement configuration configures the UE to perform early measurements for at least one RAT including the first RAT. The UE further includes means for reselecting from the first cell to the second cell configured to use a second RAT. The UE further includes means for determining whether to continue the early measurements after reselecting to the second cell based on the measurement configuration. The UE further includes means for reporting the early measurements to the second cell.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
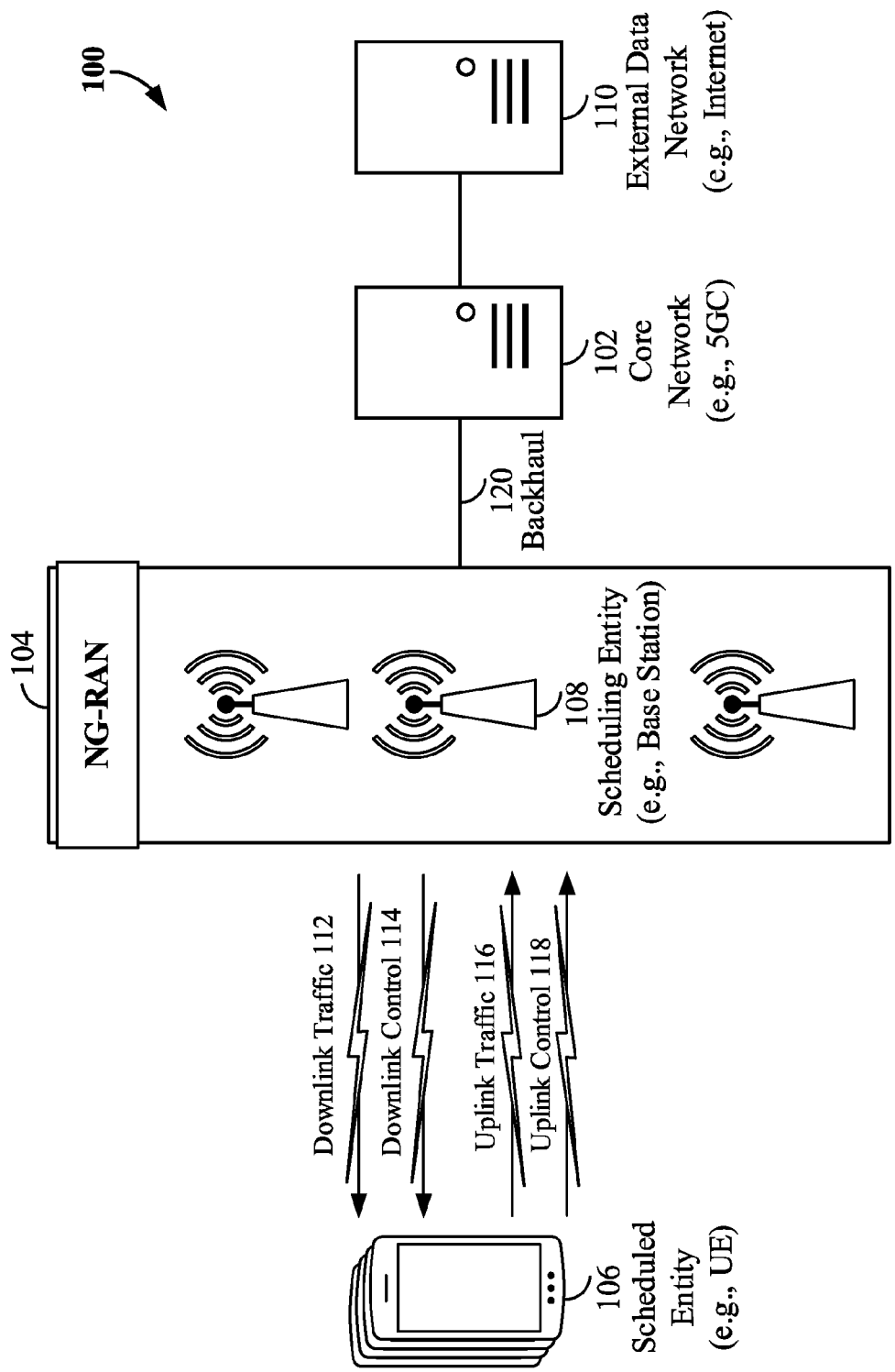
FIG. 1 is a schematic illustration of a wireless communication system according to some aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Aspects of the present disclosure relate to apparatuses, methods, and systems for performing measurements in wireless communication. In some instances, measurements may be referred to as early measurements. Early measurements may refer to measurements before, during, or after transition(s) in a wireless network (e.g., a wireless device component undergoing cell reselection). These measurements may occur at one or more times before or preceding other measurements or actions, and be used to facilitate network communications (e.g., between a UE and other devices in a communication network, such as a base station). In another example, early measurements may occur when a UE is in idle mode or inactive mode. In another example, early measurements may occur when a UE is not in a connected mode. In yet another example, a UE may perform early measurements during idle mode and not connected to a network. Still yet in other examples, a UE may autonomously perform early measurements. Flexibly employing and utilizing early measurements can enable wireless network communication components (e.g., such as UEs) to not only obtain operational performance details of network components yet also enable UEs to perform actions (e.g., such as cell re-selection, RAT re-selection, etc.) based on measured operational performance data.

As will be further discussed below, a UE may perform measurements (e.g., early measurements) according to one or more measurement configurations (e.g., a measurement configuration profile). Measurement configurations may be considered as a set of information or requests for which a UE can use to record data about a variety of network operational characteristics. Measurement configurations may also provide instructions on how a UE is to report observed/record measurements (e.g., report measurements to one or more RATs/base stations/cells). A measurement configuration may be pre-provisioned at a UE in some implementations. A UE may receive one or more measurement configurations during operation requesting the UE to conduct one or more early measurements. And in some examples, another communication network component (e.g., base station or another UE) may send a UE a measurement configuration profile for which the UE is instructed to use or leverage for performing measurements.

Measurements, such as early measurements, may be utilized and performed for a variety of uses and related to a number of factors. For example, early measurements can be used to determine a signal quality and/or coverage of cells in a network. Early measurements in a wireless network supporting multiple radio access technologies (multi-RAT) introduce new measurement reporting scenarios. Examples of radio access technology (RAT) are 4G Long-Term Evolution (LTE) and 5G new radio (NR). During inter-RAT reselection, a user equipment (UE) switches from one cell using a first RAT to another cell using a second RAT that is different from the first RAT (e.g., 4G transition to 5G and/or 5G transition to 4G). Aspects of the present disclosure provide various implementations of early measurements that may be used during inter-RAT cell reselection and may also be used in other operational scenarios as may be desired or depending on use cases, network design, etc.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure. In some example, the RAN 104 may be a multi-RAT radio access network (MR-AN) that provides one or more cells for each of a plurality of RATs, and may support inter- and intra-RAT mobility and aggregation.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), master node (MN), secondary node (SN), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
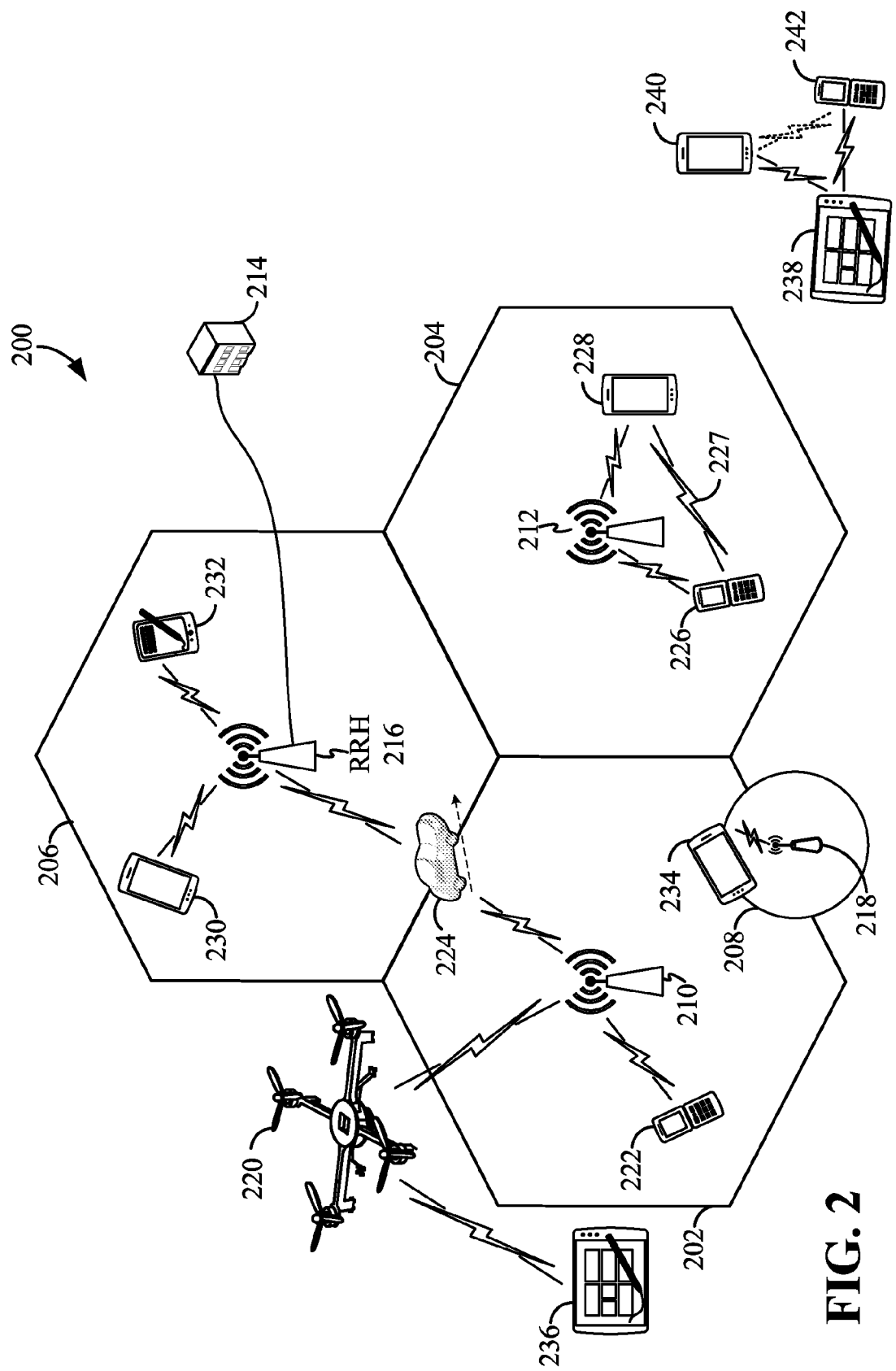
FIG. 2 is a conceptual illustration of an example of a radio access network according to some aspects of the disclosure.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. In some examples, the cells may operate using different RATs (e.g., LTE and 5G NR). FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints. In some examples, the small cell 208 may be a 5G NR cell.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. In some examples, some of the UEs may be in communication with a cell using multiple carriers in a carrier aggregation (CA) configuration. In some examples, some of the UEs may be in communication with multiple cells using different RATs in a dual connectivity (DC) configuration.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication. In cell reselection, a UE may stay in an idle mode and changes the cell from which the UE is camped on. The cell reselection process lets the UE connect to the cell with the best condition among all the cells to which the UE is allowed to camp on. The UE uses a set of criteria for the reselection process. For example, the criteria may include absolute priority, radio link quality, and cell accessibility.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In order for a UE to gain initial access to a cell, the RAN (NG-RAN 104) may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the Physical Broadcast Channel (PBCH) may carry a master information block (MIB), and the Physical Downlink Shared Channel (PDSCH) may carry a system information block type 1 (SIB1). In the art, SIB1 may be referred to as the remaining minimum system information (RMSI). OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 2 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

Figure 3:
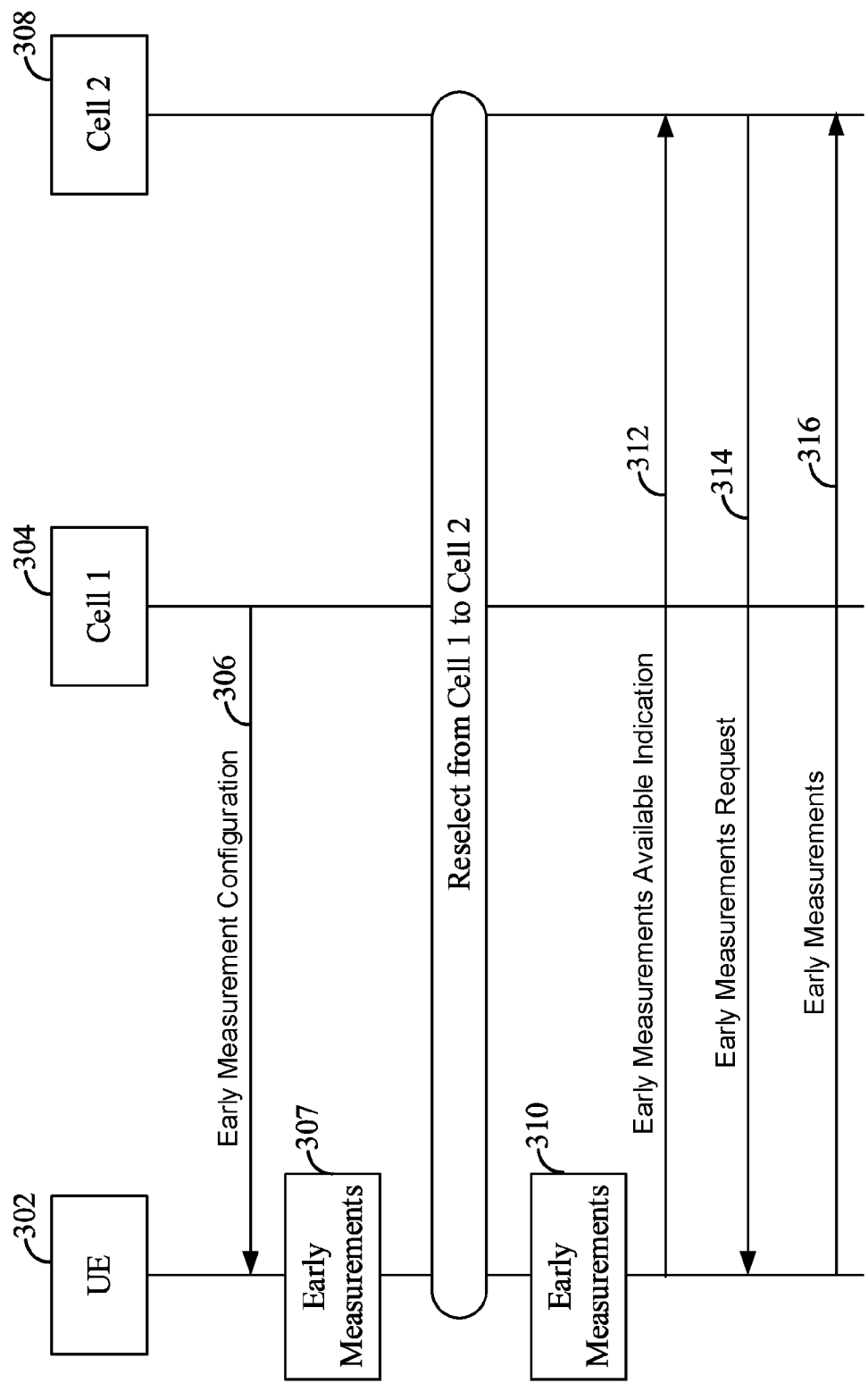
FIG. 3 is a diagram conceptually illustrating exemplary signaling for performing early measurements involving inter-RAT reselection in a wireless network according to some aspects of the disclosure.

FIG. 3 is a diagram conceptually illustrating exemplary signaling for performing early measurements involving inter-RAT reselection in a wireless network according to some aspects of the disclosure. Initially, a UE 302 is in wireless communication with a first cell 304 (Cell 1) using a first RAT (e.g., LTE or 5G NR). The first cell may provide the UE 302 with early measurement configuration 306 to facilitate the quick and efficient setup of CA and/or DC operations. Early measurements may include measuring the signal quality of the current cell and neighboring cells. Examples of signal quality measurements are reference signal received power (RSRP), reference signal received quality (RSRQ), and received signal strength indicator (RSSI). In one example, the first cell may transmit the early measurement configuration 306 in a radio resource configuration (RRC) release message, system information block (SIB), or other suitable messages. The early measurement configuration 306 may indicate the frequencies and RATs to be measured by the UE in a validity area that may include cells of different RATs. The validity area may include a list of frequencies to be measured per RAT.

The early measurement configuration 306 may indicate the validity area where the UE performs early measurements. In some aspects of the disclosure, the validity area can include multiple RATs (e.g., LTE and 5G NR). For example, the validity area may include a list of LTE and NR cells per carrier frequency. The list may provide the physical cell identifiers of the cells per RAT frequency. When the UE reselects to a cell with different RAT outside of the list (i.e., outside the validity area), the UE does not perform early measurements.

Based on the early measurement configuration 306, the UE may perform early measurements 307 of cells configured in the validity area. While the UE is in an idle mode, the UE may reselect to a second cell 308 (Cell 2) of a second RAT that is different from the first RAT used by the first cell 304. In one example, the first RAT may be 5G NR, and the second RAT may be LTE. In another example, the first RAT may be LTE, and the second RAT may be 5G NR. When the first RAT (source RAT) is different from the second RAT (target RAT), the reselection may be called an inter-RAT reselection. After inter-RAT reselection, the UE may continue to perform early measurements 310 according to different criteria that will be described in detail below. The UE 302 may transmit a message 312 to indicate the availability of early measurements to the second cell 308. For example, the UE 302 may transmit an RRC setup complete message that includes an indication of the availability of early measurements. If early measurements are available, the second cell 308 may transmit a message 314 to request the early measurements from the UE. For example, the second cell 308 may transmit the request in a UE information request message. In response, the UE 302 may transmit the early measurements 316 to the second cell 308 in a UE information response message.

Figure 4:
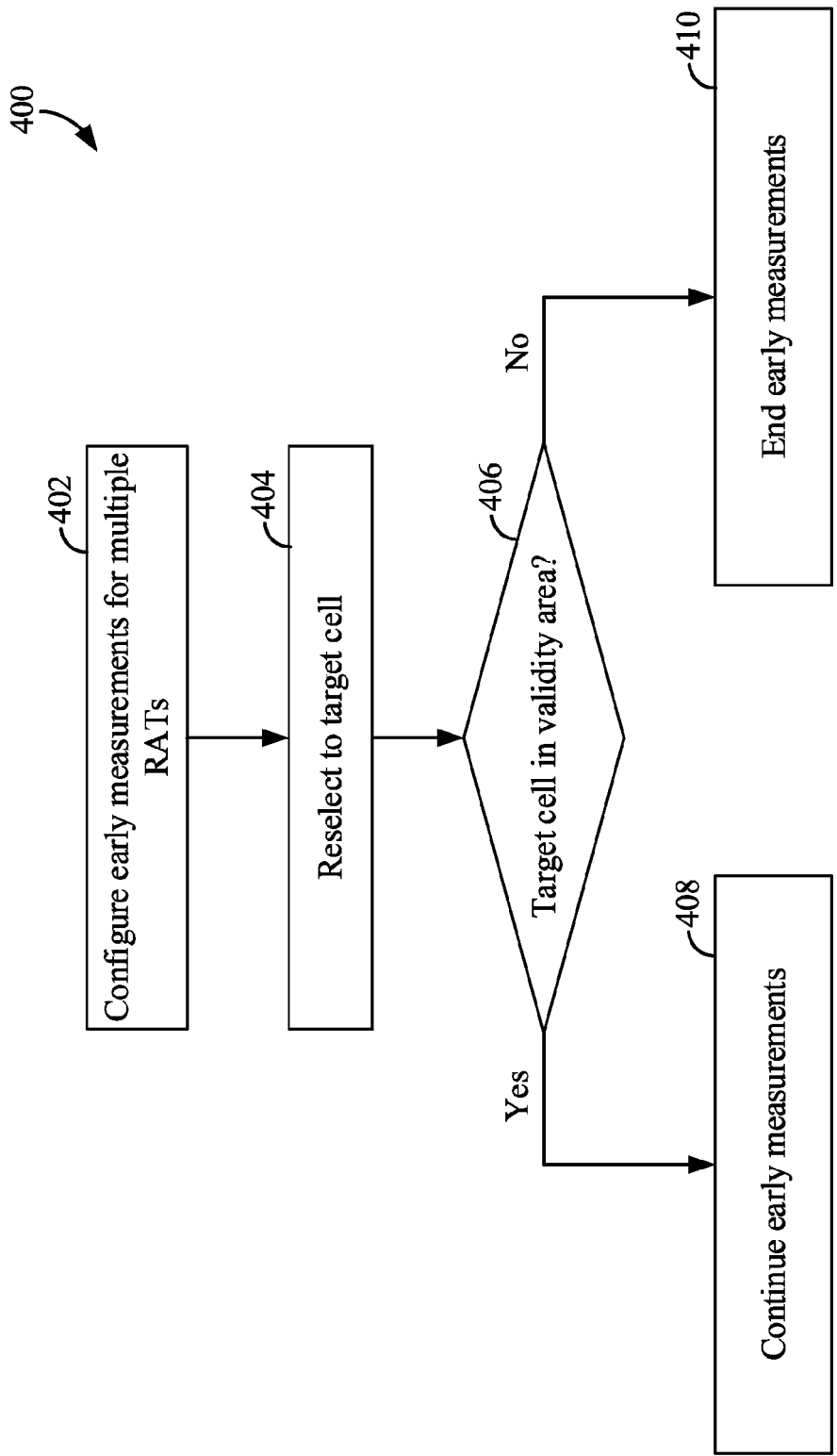
FIGS. 4-6 are flow charts conceptually illustrating a first exemplary process for performing early measurements involving inter-RAT reselection according to some aspects of the disclosure.

FIG. 4 is a flow chart conceptually illustrating a process 400 for performing early measurements involving inter-RAT reselection according to some aspects of the disclosure. As described below, some or all illustrated features may be omitted in a particular implementation within the scope of the present disclosure, and some illustrated features may not be required for implementation of all embodiments. In some examples, the process 400 may be carried out by a UE, for example, the scheduled entity 1000 illustrated in FIG. 10. In some examples, the process 400 may be carried out by any suitable apparatus or means for carrying out the functions or algorithm described below.

At block 402, the UE 302 configures early measurements for multiple RATs. For example, the UE may configure early measurements for LTE and 5G NR based on the early measurement configuration 306 received from a source cell (e.g., first cell 304). At block 404, the UE 302 reselects from a target cell (e.g., second cell 308) that is configured with different RAT. In one example, the source cell may be an LTE cell, and the target cell may be a 5G NR cell. In another example, the source cell may be a 5G NR cell, and the target cell may be an LTE cell. However, the process 400 is not limited to only LTE and 5G NR, and the process may be implemented using other RATs.

At decision block 406, the UE determines whether or not to the target cell is in a validity area. In some aspects of the disclosure, the source cell may configure the UE to perform early measurements for multiple RATs (e.g., LTE and 5G NR) in a validity area. In this case, the validity area includes cells of different RATs. If the target cell is within the validity area, the UE may continue early measurements after reselection to the target cell of different RAT; otherwise, the UE stops performing early measurements after reselection. At block 408, the UE continues to perform early measurements based on an early measurement configuration. For example, the UE may measure the signal quality (e.g., RSSI, RSRQ, and RSRP) of each frequency or band of each RAT configured for the validity area. At block 410, the UE may end early measurements when the target cell is not in the validity area.

In one implementation, the UE maintains one log file (e.g., VarMeasEarlyReport) to store the early measurements of multiple RATs (e.g., LTE and 5G NR). After inter-RAT cell reselection, the UE may report measurements of both LTE and 5G NR to the network as early measurements 316 (e.g., UEInformationResponse) upon reception of an early measurements request 314 (e.g., UEInformationRequest). In another implementation, the network may configure the UE to maintain two separate log files to store the early measurements results of different RATs. For example, the UE may store LTE measurements in a first log file named VarLTEMeasEarlyReport and NR measurements in a second log file named VarNRMeasEarlyReport. After inter-RAT cell reselection, the network may include an indication in the early measurements request (e.g., UEInformationRequest) to request the UE to report measurements for a single RAT (e.g., LTE results only or 5G NR results only) or both RATs.

Figure 5:
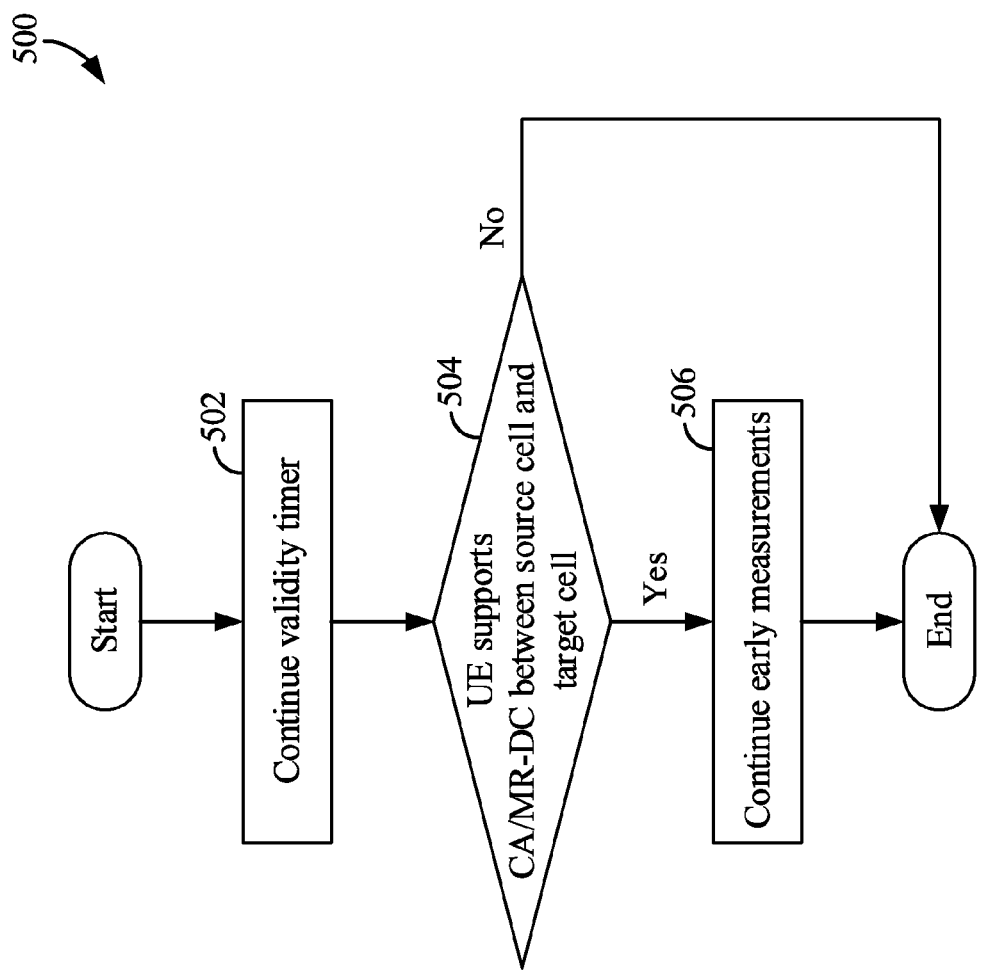

FIG. 5 is a flow chart conceptually illustrating a process 500 for performing early measurements after inter-RAT reselection according to some aspects of the disclosure. As described below, some or all illustrated features may be omitted in a particular implementation within the scope of the present disclosure, and some illustrated features may not be required for implementation of all embodiments. In some examples, the process 500 may be carried out by a UE, for example, the scheduled entity 1000 illustrated in FIG. 10 at block 408 of FIG. 4. In some examples, the process 500 may be carried out by any suitable apparatus or means for carrying out the functions or algorithm described below.

At block 502, the UE continues a validity timer configured for inter-RAT cell reselection. The UE may start the validity timer when the UE reselects from the source cell to the target cell. The UE may configure the validity timer to expire after a predetermined time interval. Before the validity timer expires, the UE may perform early measurements.

At decision block 504, the UE determines whether the UE can support carrier aggregation (CA) or multi-RAT dual connectivity (MR-DC) using the frequencies or bands supported by from the source cell and the target cell (reselected cells). The UE needs to recheck the measurement frequencies after cell reselection because the network may not support the same band combinations for MR-DC (e.g., LTE anchored MR-DC (EN-DC) or NR anchored MR-DC (NE-DC)) as the UE.

In some aspects of the disclosure, the network may provide assistance for determining CA and MR-DC support during inter-RAT reselection. The network may support certain CA and MR-DC band combinations that are different from UE capability. Thus, the network may indicate its capability on CA and MR-DC band combinations in dedicated signaling. In one aspect of the disclosure, the network (e.g., source cell or target cell) may indicate in an RRC release or RRC reconfiguration message the applicability of a multi-RAT (e.g., LTE and NR) frequency list while the UE is served in LTE or in NR, depending on the MR-DC and CA band combinations that the network supports. With the network assistance, the UE can find a common set of frequencies that are supported by both the network and the UE for band combination in CA or MR-DC. In another aspect of the disclosure, the network may indicate the applicability of a multi-RAT (e.g., LTE and NR) frequency list while the UE is served in LTE or in NR, depending on the MR-DC and CA band combinations that are supported by both the network and the UE.

At block 506, if the UE determines that the UE can support CA or MR-DC using the frequencies or bands supported by the source cell and the target cell (reselected cells), the UE may continue early measurements.

Figure 6:
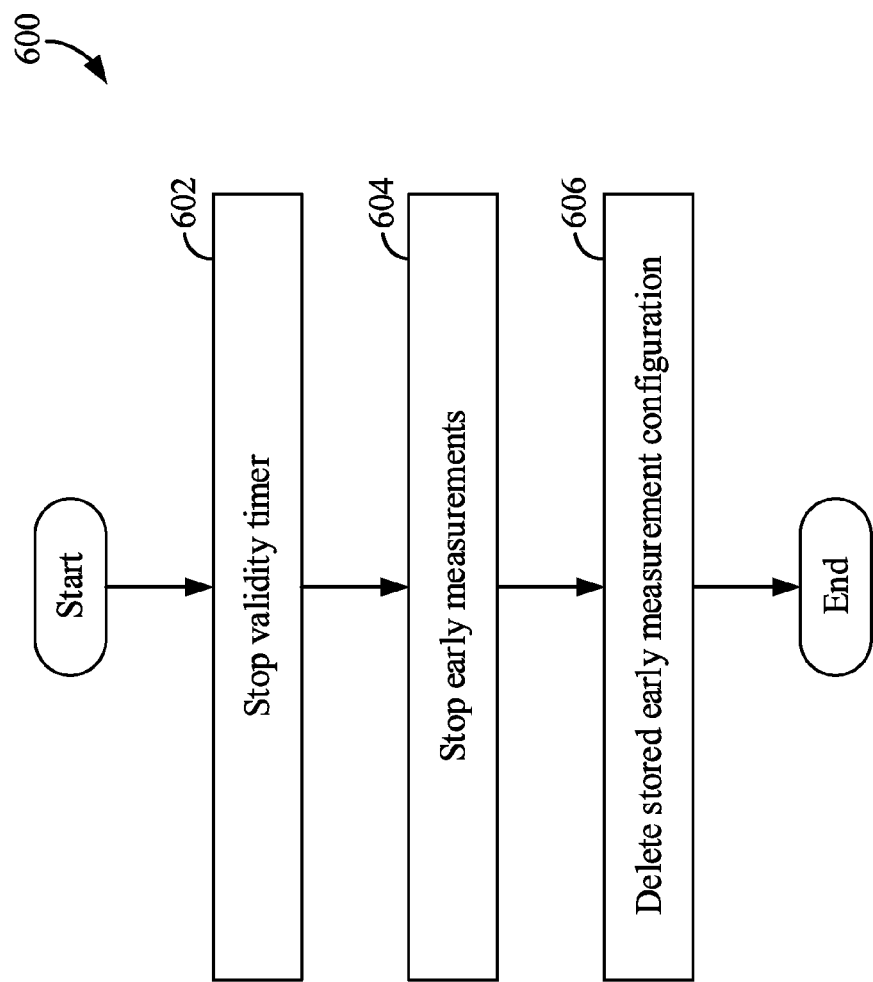

FIG. 6 is a flow chart conceptually illustrating a process 600 for terminating early measurements after inter-RAT reselection according to some aspects of the disclosure. As described below, some or all illustrated features may be omitted in a particular implementation within the scope of the present disclosure, and some illustrated features may not be required for implementation of all embodiments. In some examples, the process 600 may be carried out by a UE, for example, the scheduled entity 1000 illustrated in FIG. 10 at block 410 of FIG. 4. In some examples, the process 600 may be carried out by any suitable apparatus or means for carrying out the functions or algorithm described below.

At block 602, the UE stops a validity timer configured for inter-RAT cell reselection if the target cell is outside the configured validity area. For example, the target cell is outside the validity area if the frequency or band of the target cell is not included in a list of frequencies to be measured per RAT according to the early measurement configuration. At block 604, the UE may stop early measurements after inter-RAT reselection. At block 606, the UE may delete the stored early measurement configuration. In other aspects of the disclosure, the UE may perform the above described processes of FIG. 6 in different orders or simultaneously. In some aspects of the disclosure, the UE may still report stored early measurements, if available, after stopping early measurements in response to a request from the network to facilitate the fast setup of MR-DC (e.g., EN-DC or NE-DC).

Figure 7:
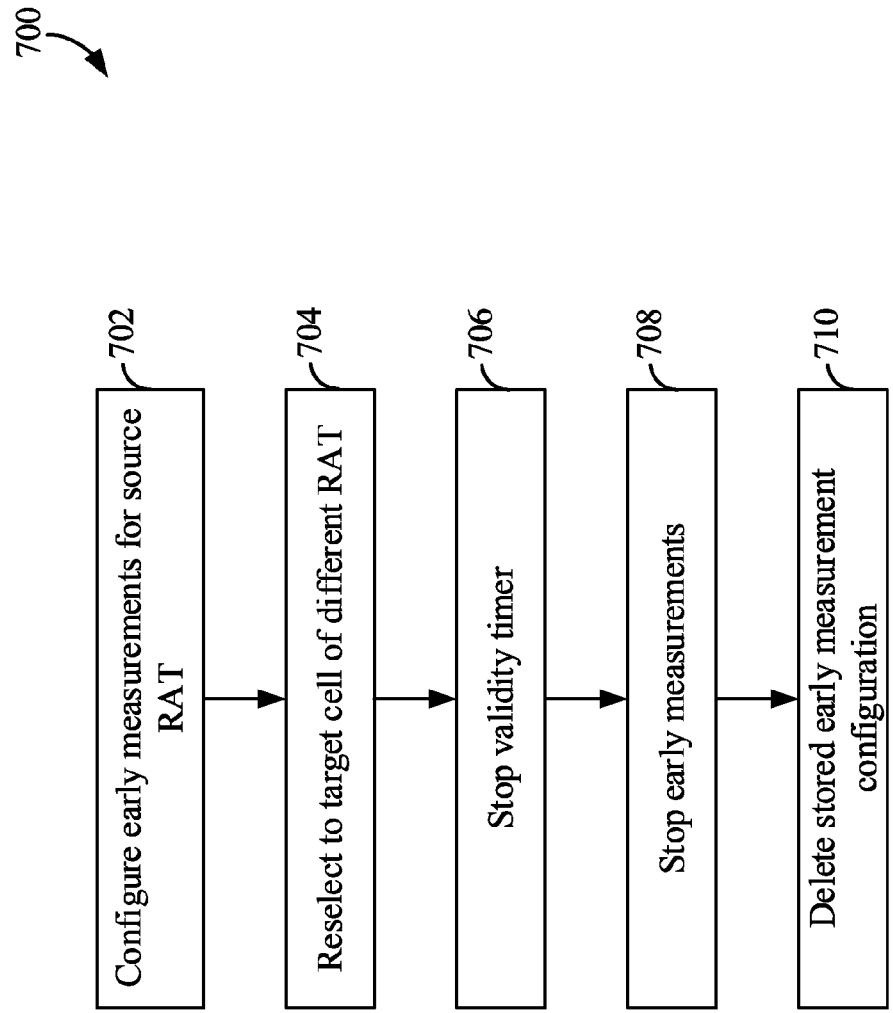
FIG. 7 is a flow chart conceptually illustrating a second exemplary process for performing early measurements involving inter-RAT reselection according to some aspects of the disclosure.

FIG. 7 is a flow chart conceptually illustrating a process 700 for performing early measurements involving inter-RAT reselection according to some aspects of the disclosure. As described below, some or all illustrated features may be omitted in a particular implementation within the scope of the present disclosure, and some illustrated features may not be required for implementation of all embodiments. In some examples, the process 700 may be carried out by a UE, for example, the scheduled entity 1000 illustrated in FIG. 10. In some examples, the process 700 may be carried out by any suitable apparatus or means for carrying out the functions or algorithm described below.

At block 702, the UE 302 configures early measurements for the RAT used by a source cell. For example, the UE may configure early measurements for LTE or 5G NR based on the early measurement configuration 306 received from a source cell (e.g., first cell 304). In one example, if the source cell uses LTE, the UE configures early measurements for LTE. In another example, if the source cell uses 5G NR, the UE configures early measurements for 5G NR. At block 704, the UE reselects to a target cell of different RAT. For example, the UE may reselect from a source cell to a target cell if the UE determines that the target cell can provide better coverage or signal quality than the source cell. At block 706, the UE may stop a validity timer after inter-RAT cell reselection. In this case, the UE stops the validity timer when the UE determines that the RAT of the target cell is different from the RAT of the source cell. At block 708, the UE may stop performing early measurements after inter-RAT cell reselection. At block 710, the UE may delete the stored early measurement configuration. In some aspects of the disclosure, the UE may still report any stored early measurement results, if available, to the network upon reception of a request to facilitate the fast setup of MR-DC (e.g., EN-DC or NE-DC).

Figure 8:
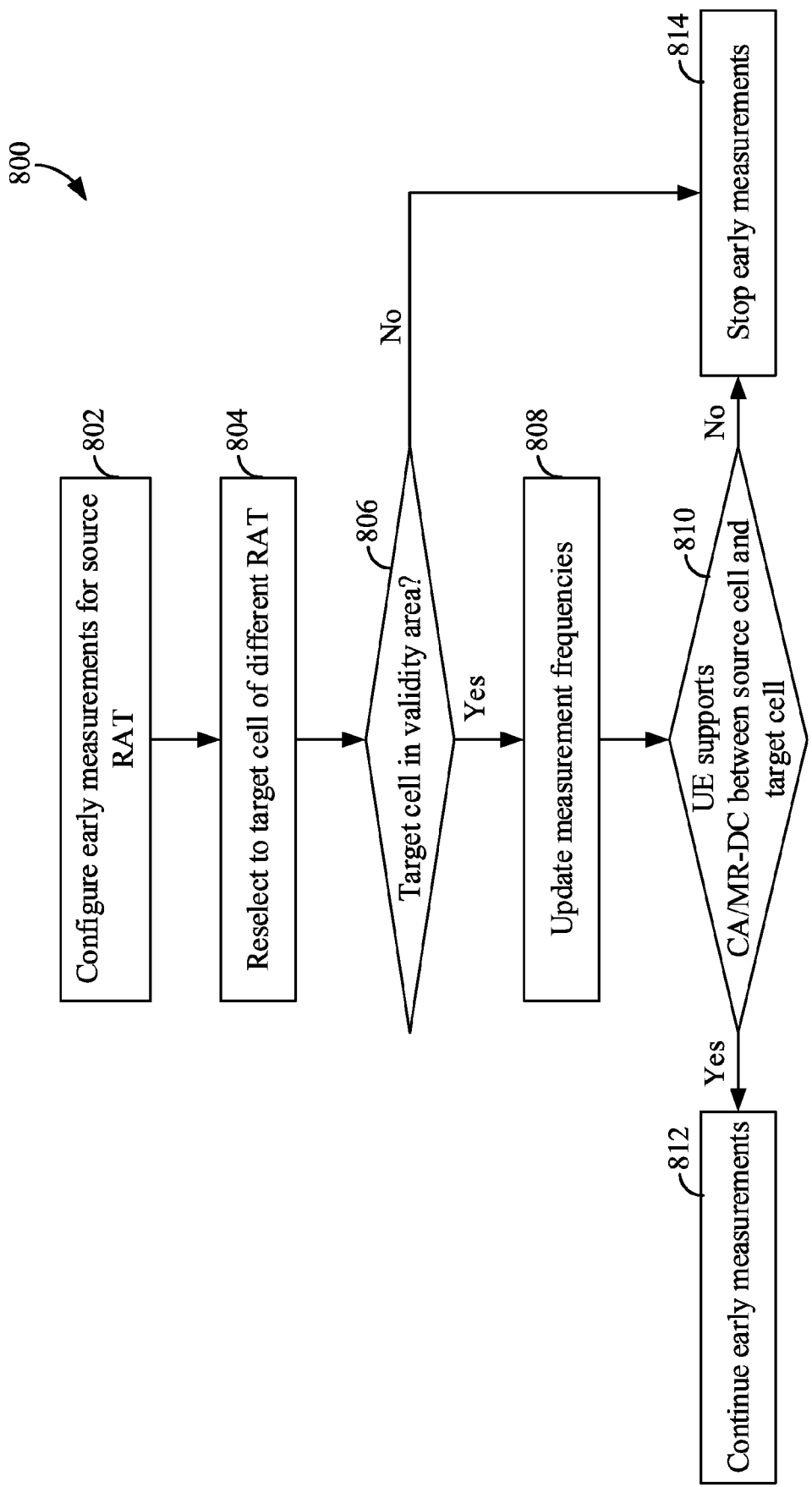
FIG. 8 is a flow chart conceptually illustrating a third exemplary process for performing early measurements involving inter-RAT reselection according to some aspects of the disclosure.

FIG. 8 is a flow chart conceptually illustrating a process 800 for performing early measurements involving inter-RAT reselection according to some aspects of the disclosure. As described below, some or all illustrated features may be omitted in a particular implementation within the scope of the present disclosure, and some illustrated features may not be required for implementation of all embodiments. In some examples, the process 800 may be carried out by a UE, for example, the scheduled entity 1000 illustrated in FIG. 10. In some examples, the process 800 may be carried out by any suitable apparatus or means for carrying out the functions or algorithm described below.

At block 802, the UE 302 configures early measurements for the RAT used by a source cell. For example, the UE may configure early measurements for LTE or 5G NR based on the early measurement configuration 306 received from a source cell (e.g., first cell 304). In one example, if the source cell uses LTE, the UE configures early measurements for LTE. In another example, if the source cell uses 5G NR, the UE configures early measurements for 5G NR. At block 804, the UE reselects to a target cell of different RAT. For example, the UE may reselect from a source cell to a target cell if the UE determines that the target cell can provide better coverage or signal quality than the source cell.

At decision block 806, the UE determines whether or not the target cell is in the configured validity area. For example, the target cell is inside the validity area if the frequency or band of the target cell is included in a list of frequencies to be measured per RAT according to the early measurement configuration. At block 808, the UE may update the measurement frequencies or bands if the target cell is within the configured validity area. For example, the UE may update the stored early measurement configuration to add the measurement frequencies indicated in an SIB received from the target cell after reselection. At decision block 810, the UE determines whether or not the UE can support CA or MR-DC using the frequencies or bands available from the source cell and the target cell.

In some aspects of the disclosure, the network may provide assistance for determining CA and MR-DC support during inter-RAT reselection. The network may support certain CA and MR-DC band combinations that are different from UE capability. Thus, the network may indicate its capability on CA and MR-DC band combinations in dedicated signaling. In one aspect of the disclosure, the network (e.g., target cell) may indicate in an RRC release or RRC reconfiguration message the applicability of a multi-RAT frequency list while the UE is served in LTE or in NR, depending on the MR-DC and CA band combinations that the network supports. With the network assistance, the UE can find a common set of frequencies that are supported by both the network and the UE for band combination in CA or MR-DC. In another aspect of the disclosure, the network may indicate the applicability of a multi-RAT frequency list while the UE is served in LTE or in NR, depending on the MR-DC and CA band combinations that are supported by both the network and the UE.

At block 812, the UE may continue early measurements if the UE can support CA or MR-DC using the frequencies or bands available from the source cell and the target cell. At block 814, the UE may stop early measurements if the UE cannot support CA or MR-DC using the frequencies or bands available from the source cell and the target cell. After inter-RAT reselection, the UE needs to check measurement frequencies because the network (e.g., target cell) may not support the same frequency or band combinations for MR-DC (e.g., EN-DC and NE-DC) as the UE.

Figure 9:
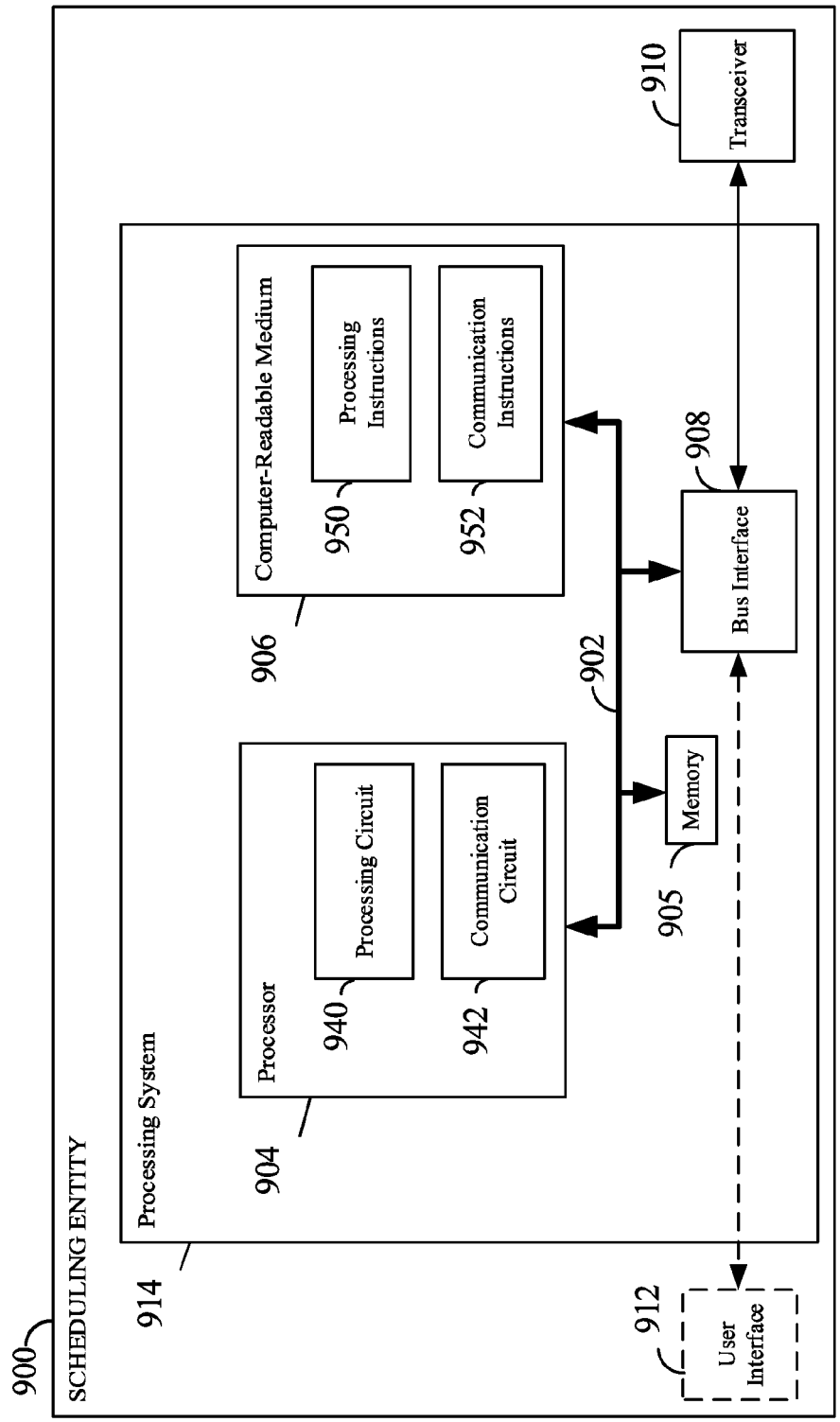
FIG. 9 is a block diagram conceptually illustrating an example of a hardware implementation for a scheduling entity according to some aspects of the disclosure.

FIG. 9 is a block diagram illustrating an example of a hardware implementation for a scheduling entity 900 employing a processing system 914. For example, the scheduling entity 900 may be a user equipment (UE) as illustrated in any one or more of FIGS. 1, 2, and/or 3. In another example, the scheduling entity 900 may be a base station (e.g., gNB or eNB) as illustrated in any one or more of FIGS. 1, 2, and/or 3.

The scheduling entity 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 900 may be configured to perform any one or more of the functions described herein. That is, the processor 904, as utilized in a scheduling entity 900, may be used to implement any one or more of the processes and procedures described and illustrated in FIGS. 3-8 and 11.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a communication interface or means for communicating with various other apparatus over a transmission medium using one or more radio access technologies (e.g., LTE and 5G NR). Depending upon the nature of the apparatus, a user interface 912 (e.g., keypad, display, speaker, microphone, joystick) may also be provided. Of course, such a user interface 912 is optional, and may be omitted in some examples, such as a base station.

In some aspects of the disclosure, the processor 904 may include circuitry configured for various functions, including, for example, wireless communication involving inter-RAT reselection. For example, the circuitry may be configured to implement one or more of the functions described in relation to FIGS. 3-8 and 11. The circuitry may include a processing circuit 940 and a communication circuit 942. The processing circuit 940 may be configured to perform various data processing, computing, and logical functions, including, for example, functions used in wireless communication. The communication circuit 942 may be configured to perform various communication functions, including, transmission and reception of wireless communication signals. For example, the communication circuit 942 together with the transceiver 910 may be configured to establish communication with a scheduled entity (e.g., UE) described in this disclosure using a wireless network that supports multiple radio access technologies. The communication circuit 942 may be configured to control and configure cell reselection in a network as described in relation to FIGS. 3-8 and 11.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may include software configured for various functions, including, for example, wireless communication involving inter-RAT reselection. For example, the software may be configured to implement one or more of the functions described in relation to FIGS. 3-8 and 11. The software may include processing instructions 950 and communication instructions 952. The scheduling entity 900 when executing the processing instructions 950 may perform various data processing, computing, and logical functions, including, for example, functions used in wireless communication. The scheduling entity 900 when executing the communication instructions 952 may perform various communication functions, including, transmission and reception of wireless communication signals. For example, the scheduling entity 900 when executing the communication instructions 952 may establish communication with a scheduled entity (e.g., UE) described in this disclosure using a wireless network that supports multiple radio access technologies. The scheduling entity 900 when executing the communication instructions 952 may control and configure cell reselection in a network as described in relation to FIGS. 3-8 and 11.

Figure 10:
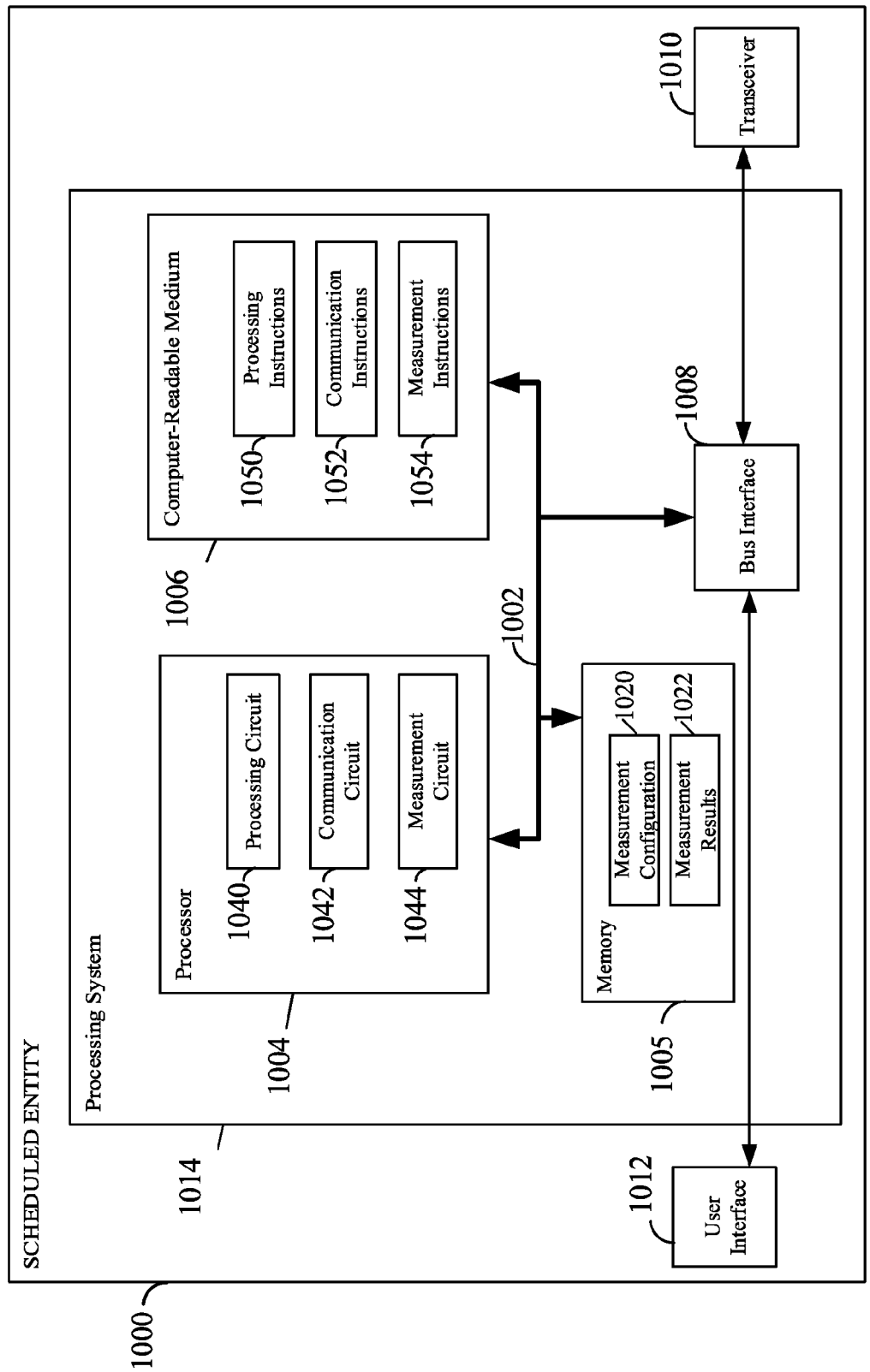
FIG. 10 is a block diagram conceptually illustrating an example of a hardware implementation for a scheduled entity according to some aspects of the disclosure.

FIG. 10 is a conceptual diagram illustrating an example of a hardware implementation for an exemplary scheduled entity 1000 employing a processing system 1014. In accordance with various aspects of the disclosure, an element, or any portion of an element, or any combination of elements may be implemented with a processing system 1014 that includes one or more processors 1004. For example, the scheduled entity 1000 may be a user equipment (UE) as illustrated in any one or more of FIGS. 1,2, and/or 3.

The processing system 1014 may be substantially the same as the processing system 914 illustrated in FIG. 9, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in FIG. 9. That is, the processor 1004, as utilized in a scheduled entity 1000, may be used to implement any one or more of the functions and processes described and illustrated in relation to FIGS. 3-8 and 11.

In some aspects of the disclosure, the processor 1004 may include circuitry configured for various functions, including, for example, wireless communication involving inter-RAT reselection. For example, the circuitry may be configured to implement one or more of the functions and processes described in relation to FIGS. 3-8 and 11. The circuitry may include a processing circuit 1040, a communication circuit 1042, and a measurement circuit 1044. The processing circuit 1040 may be configured to perform various data processing, computing, and logical functions, including, for example, functions used in wireless communication. The communication circuit 1042 may be configured to perform various communication functions, including, transmission and reception of wireless communication signals. For example, the communication circuit 1042 together with the transceiver 1010 may be configured to establish communication with a scheduling entity (e.g., eNB or gNB) described in this disclosure using a wireless network that supports multiple radio access technologies (e.g., LTE and 5G NR). The communication circuit 1042 may be configured to control and configure cell reselection in a network. The measurement circuit 1044 may be configured to perform network measurements based on a measurement configuration 1020 stored in the memory 1005. The scheduled entity may receive the measurement configuration 1020 from the network (e.g., a scheduling entity). In one example, the measurement circuit 1044 together with the transceiver 1010 may measure the signal quality (e.g., RSSI, RSRQ, and RSRP) of different frequencies or bands of a network that supports multiple radio access technologies (e.g., LTE and 5G NR). The scheduled entity may store the measurement results 1022 in the memory 1005, for example, as one or more log files.

In one or more examples, the computer-readable storage medium 1006 may include software configured for various functions, including, for example, wireless communication involving inter-RAT reselection. For example, the software may be configured to implement one or more of the functions described in relation to FIGS. 3-8 and 11. The software may include processing instructions 1050, communication instructions 1052, and measurement instructions 1054. The scheduled entity 1000 when executing the processing instructions 1050 may perform various data processing, computing, and logical functions, including, for example, functions used in wireless communication. The scheduled entity 1000 when executing the communication instructions 1052 may perform various communication functions, including, transmission and reception of wireless communication signals. For example, the scheduled entity 1000 when executing the communication instructions 1052 may establish communication with a scheduling entity (e.g., eNB or gNB) described in this disclosure using a wireless network that supports multiple radio access technologies (e.g., LTE and 5G NR). The scheduled entity 1000 when executing the communication instructions 1052 may control and configure cell reselection in a network. The scheduled entity 1000 when executing the measurement instructions 1054 may measure the signal quality (e.g., RSSI, RSRQ, and RSRP) of different frequencies of a network that supports multiple radio access technologies (e.g., LTE and 5G NR).

Figure 11:
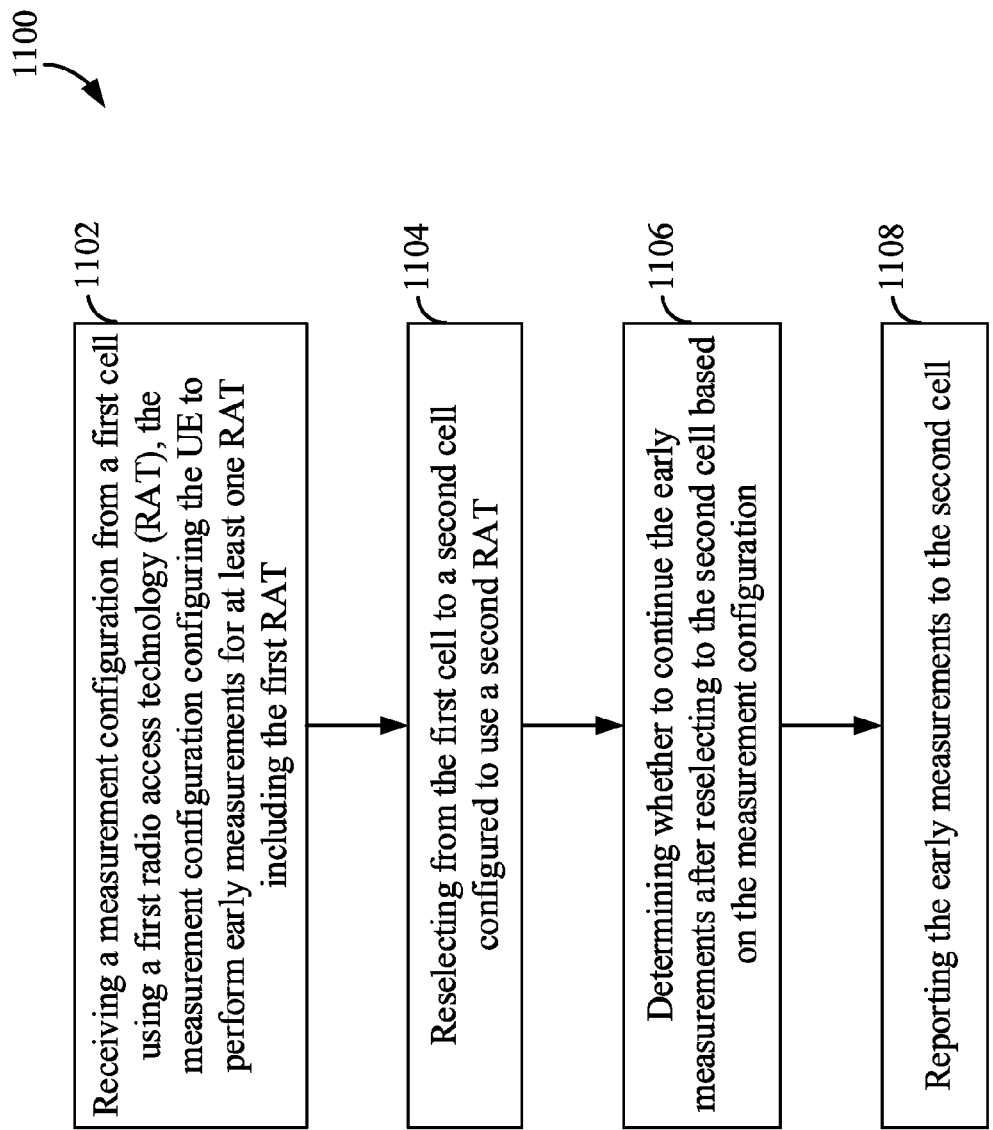
FIG. 11 is a flow chart illustrating an exemplary process for reporting early measurements during inter-RAT reselection according to some aspects of the present disclosure.

FIG. 11 is a flow chart illustrating an exemplary process 1100 for reporting early measurements during inter-RAT reselection according to some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduled entity 1000 (e.g., UE) illustrated in FIG. 10. In some examples, the process 1100 may be carried out by any suitable apparatus or means for carrying out the functions or algorithm described below.

At block 1102, the scheduled entity receives a measurement configuration from a first cell using a first RAT. For example, the scheduled entity may use the communication circuit 1042 and transceiver 1010 to receive an early measurement configuration from a first cell (a source cell). The measurement configuration configures the scheduled entity to generate early measurements for at least one RAT including the first RAT. In some examples, the measurement configuration configures the scheduled entity to measure the first RAT and a second RAT that is different from the first RAT. In some examples, the scheduled entity may use the measurement circuit 1044 and transceiver 1010 to measure the signal quality (e.g., RSSI, RSRQ, and RSRP) of different frequencies or bands of the network indicated in the measurement configuration.

At block 1104, the scheduled entity reselects to a second cell (target cell) configured to use a second RAT. For example, the scheduled entity may use the communication circuit 1042 and transceiver 1010 to reselect to the second cell. The second RAT may be different from the first RAT. In one example, the first RAT may be LTE and the second RAT may be 5G NR. In another example, the first RAT may be 5G NR and the second RAT may be LTE. At block 1106, the scheduled entity determines whether to continue the early measurements after reselecting to the second cell based on the measurement configuration. For example, the scheduled entity may use the measurement circuit 1044 to determine whether or not to continue early measurements after reselection using any of the processes described above in relation to FIGS. 3-8.

In one example, the scheduled entity may determine that the second cell is inside a validity area configured for inter-RAT reselection according to the measurement configuration. In that case, the scheduled entity continues a validity timer associated with the early measurements. In one example, the scheduled entity may determine to end the early measurements when the second cell is outside a validity area configured for inter-RAT reselection according to the measurement configuration. To that end, the scheduled entity may stop a validity timer associated with the early measurements and discard the measurement configuration. In another example, the scheduled entity may pause the validity timer and keep the measurement configuration. Then, the scheduled entity may resume the early measurements and the validity timer after reselecting to a cell in the validity area.

At block 1108, the scheduled entity may report the early measurements to the second cell if requested. For example, the scheduled entity may use the communication circuit 1042 and transceiver 1010 to transmit the stored early measurements, if any, to the second cell.

In one configuration, the apparatus 1000 for wireless communication includes means for controlling, configuring and performing early measurements during inter-RAT reselection. In one aspect, the aforementioned means may be the processor(s) 1004 and/or other circuitry described in relation to FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, and/or 3, and utilizing, for example, the processes and/or algorithms described herein in relation to FIGS. 3-8 and/or 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of operating a user equipment (UE) in a network comprising a first cell and a second cell, comprising:
   receiving a measurement configuration from the first cell using a first radio access technology (RAT), the measurement configuration configuring the UE to perform early measurements for the first RAT and a second RAT;
   reselecting from the first cell to the second cell configured to use the second RAT;
   determining whether to continue the early measurements after reselecting to the second cell based on the measurement configuration, wherein determining whether to continue the early measurements comprises:
   determining that the second cell is inside a validity area associated with inter-RAT reselection according to the measurement configuration;
   determining that the UE is capable of carrier aggregation or multi-RAT dual connectivity using a frequency of the first cell and a frequency of the second cell; and
   continuing a validity timer associated with the early measurements; and
   reporting the early measurements to the second cell.

2. The method of claim 1, wherein the validity area comprises cells of different RATs.

3. The method of claim 1, wherein the determining whether to continue the early measurements further comprises:
   determining to end the early measurements when the second cell is outside a validity area configured for inter-RAT reselection according to the measurement configuration.

4. The method of claim 3, wherein the determining whether to continue the early measurements further comprises:
   stopping a validity timer associated with the early measurements; and
   discarding the measurement configuration.

5. The method of claim 3, wherein the determining whether to continue the early measurements further comprises:
   pausing a validity timer associated with the early measurements;
   keeping the measurement configuration; and
   resuming the early measurements and the validity timer after reselecting to a third cell in the validity area.

6. The method of claim 1, wherein the determining whether to continue the early measurements comprises:
   determining to end the early measurements after reselecting to the second cell of the second RAT.

7. The method of claim 1, wherein the determining whether to continue the early measurements comprises:
   determining that the second cell is inside a validity area configured for inter-RAT reselection according to the measurement configuration.

8. The method of claim 7, wherein the determining whether to continue the early measurements comprises:
   receiving system information from the second cell; and
   updating the measurement configuration with the system information of the second cell.

9. The method of claim 1, further comprising:
   storing the early measurements of the first RAT in a first log file; and
   storing the early measurements of the second RAT in a second log file that is different from the first log file.

10. The method of claim 9, wherein the reporting the early measurements comprises:
   reporting the early measurements stored in the first log file, in the second log file, or in both the first log file and the second log file to the network, according to an indication received from the network after reselecting to the second cell.

11. The method of claim 1, further comprising:
   storing the early measurements of both the first RAT and the second RAT in a single log file.

12. The method of claim 11, wherein the reporting the early measurements comprises:
   reporting the early measurements stored in the single log file to the network after reselecting to the second cell of the second RAT.

13. The method of claim 1, wherein the measurement configuration is configured to provide carrier aggregation (CA) or dual connectivity (DC) band combination information.

14. The method of claim 13, wherein the CA or DC band combination information comprises a band combination supported by the network.

15. The method of claim 13, wherein the CA or DC band combination information comprises a band combination supported by the network and the UE.

16. A user equipment (UE) for wireless communication, comprising:
   a communication interface configured to communicate with a network comprising a first cell and a second cell;
   at least one memory; and
   at least one processor operatively coupled to the communication interface and the at least one memory,
   wherein the at least one processor and the at least one memory are configured to cause the UE to:
   receive a measurement configuration from the first cell using a first radio access technology (RAT), the measurement configuration configuring the UE to perform early measurements for at least one RAT comprising the first RAT;
   reselect from the first cell to the second cell that is configured to use a second RAT;
   determine whether to continue the early measurements after reselecting to the second cell based on the measurement configuration, wherein to determine whether to continue the early measurements, the at least one processor and the at least one memory are configured to cause the UE to:
   determine that the second cell is inside a validity area associated with inter-RAT reselection according to the measurement configuration;
   determine that the UE is capable of carrier aggregation or multi-RAT dual connectivity using a frequency of the first cell and a frequency of the second cell; and
   continue a validity timer associated with the early measurements; and
   report the early measurements to the second cell.

17. The UE of claim 16, wherein the validity area comprises cells of different RATs.

18. The UE of claim 16, wherein, for determining whether to continue the early measurements, the at least one processor and the at least one memory are further configured to cause the UE to:
   determine to end the early measurements when the second cell is outside a validity area configured for inter-RAT reselection according to the measurement configuration.

19. The UE of claim 18, wherein, for determining whether to continue the early measurements, the at least one processor and the at least one memory are further configured to cause the UE to:
   stop a validity timer associated with the early measurements; and
   discard the measurement configuration.

20. The UE of claim 18, wherein, for determining whether to continue the early measurements, the at least one processor and the at least one memory are further configured to cause the UE to:
   pause a validity timer associated with the early measurements;
   keep the measurement configuration; and
   resume the early measurements and the validity timer after reselecting to a third cell in the validity area.

21. The UE of claim 16, wherein, for determining whether to continue the early measurements, the at least one processor and the at least one memory are further configured to cause the UE to:
   determine to end the early measurements after reselecting to the second cell of the second RAT.

22. The UE of claim 16, wherein, for determining whether to continue the early measurements, the at least one processor and the at least one memory are further configured to cause the UE to:
   determine that the second cell is inside a validity area configured for inter-RAT reselection according to the measurement configuration.

23. The UE of claim 22, wherein, for determining whether to continue the early measurements, the at least one processor and the at least one memory are further configured to cause the UE to:
   receive system information from the second cell; and
   update the measurement configuration with the system information of the second cell.

24. The UE of claim 16, wherein the at least one processor and the at least one memory are further configured to cause the UE to:
   store the early measurements of the first RAT in a first log file; and
   store the early measurements of the second RAT in a second log file that is different from the first log file.

25. The UE of claim 24, wherein the at least one processor and the at least one memory are further configured to cause the UE to:
   report the early measurements stored in the first log file, in the second log file, or in both the first log file and the second log file to the network, according to an indication received from the network after reselecting to the second cell.

26. The UE of claim 16, wherein the at least one processor and the at least one memory are further configured to cause the UE to:
   store the early measurements of both the first RAT and the second RAT in a single log file.

27. The UE of claim 26, wherein the at least one processor and the at least one memory are further configured to cause the UE to:
   report the early measurements stored in the single log file to the network after reselecting to the second cell of the second RAT.

28. The UE of claim 16, wherein the measurement configuration is configured to provide carrier aggregation (CA) or dual connectivity (DC) band combination information.

29. The UE of claim 28, wherein the CA or DC band combination information comprises a band combination supported by the network.

30. The UE of claim 28, wherein the CA or DC band combination information comprises a band combination supported by the network and the UE.

31. A non-transitory computer readable medium comprising executable code that when executed by a user equipment (UE) in a network comprising a first cell and a second cell, causes the UE to:
receive a measurement configuration from the first cell using a first radio access technology (RAT), the measurement configuration configuring the UE to perform early measurements for at least one RAT comprising the first RAT;
reselect from the first cell to the second cell configured to use a second RAT;
determine whether to continue the early measurements after reselecting to the second cell based on the measurement configuration, wherein to determine whether to continue the early measurements, the executable code further causes the UE to:
determine that the second cell is inside a validity area associated with inter-RAT reselection according to the measurement configuration;
determine that the UE is capable of carrier aggregation or multi-RAT dual connectivity using a frequency of the first cell and a frequency of the second cell; and
continue a validity timer associated with the early measurements; and
report the early measurements to the second cell.

32. The non-transitory computer readable medium of claim 31, wherein the validity area comprises cells of different RATs.

33. The non-transitory computer readable medium of claim 31, wherein for determining whether to continue the early measurements, the executable code further causes the UE to:
determine to end the early measurements when the second cell is outside a validity area configured for inter-RAT reselection according to the measurement configuration.

34. The non-transitory computer readable medium of claim 33, wherein the executable code further causes the UE to:
stop a validity timer associated with the early measurements; and
discard the measurement configuration.

35. The non-transitory computer readable medium of claim 33, wherein the executable code further causes the UE to:
pause a validity timer associated with the early measurements;
keep the measurement configuration; and
resume the early measurements and the validity timer after reselecting to a third cell in the validity area.

36. The non-transitory computer readable medium of claim 31, wherein for determining whether to continue the early measurements, the executable code further causes the UE to:
determine to end the early measurements after reselecting to the second cell of the second RAT.

37. The non-transitory computer readable medium of claim 31, wherein for determining whether to continue the early measurements, the executable code further causes the UE to:
determine that the second cell is inside a validity area configured for inter-RAT reselection according to the measurement configuration.

38. The non-transitory computer readable medium of claim 37, wherein the executable code further causes the UE to:
receive system information from the second cell; and
update the measurement configuration with the system information of the second cell.

39. The non-transitory computer readable medium of claim 31, wherein the executable code further causes the UE to:
store the early measurements of the first RAT in a first log file; and
store the early measurements of the second RAT in a second log file that is different from the first log file.

40. The non-transitory computer readable medium of claim 39, wherein for reporting the early measurements, the executable code further causes the UE to:
report the early measurements stored in the first log file, in the second log file, or in both the first log file and the second log file to the network, according to an indication received from the network after reselecting to the second cell.

41. The non-transitory computer readable medium of claim 31, wherein the executable code further causes the UE to:
store the early measurements of both the first RAT and the second RAT in a single log file.

42. The non-transitory computer readable medium of claim 41, wherein for reporting the early measurements, the executable code further causes the UE to:
report the early measurements stored in the single log file to the network after reselecting to the second cell of the second RAT.

43. The non-transitory computer readable medium of claim 31, wherein the measurement configuration is configured to provide carrier aggregation (CA) or dual connectivity (DC) band combination information.

44. The non-transitory computer readable medium of claim 43, wherein the CA or DC band combination information comprises a band combination supported by the network.

45. The non-transitory computer readable medium of claim 43, wherein the CA or DC band combination information comprises a band combination supported by the network and the UE.

46. A user equipment (UE) in a network comprising a first cell and a second cell, comprising:
means for receiving a measurement configuration from the first cell using a first radio access technology (RAT), the measurement configuration configuring the UE to perform early measurements for at least one RAT comprising the first RAT;
means for reselecting from the first cell to the second cell configured to use a second RAT;
means for determining whether to continue the early measurements after reselecting to the second cell based on the measurement configuration, wherein the means for determining whether to continue the early measurements comprises:

means for determining that the second cell is inside a validity area associated with inter-RAT reselection according to the measurement configuration;

means for determining that the UE is capable of carrier aggregation or multi-RAT dual connectivity using a frequency of the first cell and a frequency of the second cell; and means for continuing a validity timer associated with the early measurements; and means for reporting the early measurements to the second cell.

47. The UE of claim 46, wherein the validity area comprises cells of different RATs.

48. The UE of claim 46, wherein the means for determining whether to continue the early measurements is further configured to:

determine to end the early measurements when the second cell is outside a validity area configured for inter-RAT reselection according to the measurement configuration.

49. The UE of claim 48, wherein the means for determining whether to continue the early measurements is further configured to:

stop a validity timer associated with the early measurements; and discard the measurement configuration.

50. The UE of claim 48, wherein the means for determining whether to continue the early measurements is further configured to:

pause a validity timer associated with the early measurements;

keep the measurement configuration; and resume the early measurements and the validity timer after reselecting to a third cell in the validity area.

51. The UE of claim 46, wherein the means for determining whether to continue the early measurements is configured to:

determine to end the early measurements after reselecting to the second cell of the second RAT.

52. The UE of claim 46, wherein the means for determining whether to continue the early measurements is configured to:

determine that the second cell is inside a validity area configured for inter-RAT reselection according to the measurement configuration.

53. The UE of claim 52, wherein the means for determining whether to continue the early measurements is configured to:

receive system information from the second cell; and update the measurement configuration with the system information of the second cell.

54. The UE of claim 46, further comprising:

means for storing the early measurements of the first RAT in a first log file, and storing the early measurements of the second RAT in a second log file that is different from the first log file.

55. The UE of claim 54, wherein the means for reporting the early measurements is configured to:

report the early measurements stored in the first log file, in the second log file, or in both the first log file and the second log file to the network, according to an indication received from the network after reselecting to the second cell.

56. The UE of claim 46, further comprising:

means for storing the early measurements of both the first RAT and the second RAT in a single log file.

57. The UE of claim 56, wherein the means for reporting the early measurements is configured to:

report the early measurements stored in the single log file to the network after reselecting to the second cell of the second RAT.

58. The UE of claim 46, wherein the measurement configuration is configured to provide carrier aggregation (CA) or dual connectivity (DC) band combination information.

59. The UE of claim 58, wherein the CA or DC band combination information comprises a band combination supported by the network.

60. The UE of claim 58, wherein the CA or DC band combination information comprises a band combination supported by the network and the UE.

* * * * *